United States Patent [19]

Teranishi

[11] Patent Number: 5,282,329
[45] Date of Patent: Feb. 1, 1994

[54] SOLENOID TYPE CONTROL VALVE

[75] Inventor: Toshihiro Teranishi, Saitama, Japan

[73] Assignees: Kabushiki Kaisha Saginomiya Seisakusho; Kabushiki Kaisha Toyoda Jidoshokki Seisakusho, both of Japan

[21] Appl. No.: 37,113

[22] Filed: Mar. 25, 1993

[30] Foreign Application Priority Data

Apr. 3, 1992 [JP] Japan .................. 4-81937

[51] Int. Cl.$^5$ .................. F16K 11/10; F16K 31/06
[52] U.S. Cl. .................. 137/596.17; 251/129.14; 251/129.08
[58] Field of Search .................. 137/596.17, 627.5; 251/129.14, 129.08

[56] References Cited

U.S. PATENT DOCUMENTS 5,076,323 12/1991 Schudt .................. 137/596.17

FOREIGN PATENT DOCUMENTS 62-247186 10/1987 Japan.

Primary Examiner—Arnold Rosenthal
Attorney, Agent, or Firm—Lowe, Price, LeBlanc & Becker

[57] ABSTRACT

This invention reduces the size of the solenoid section of the control valve and simplifies its mechanism. In particular, the invention is intended to enable the control of a variable capacity compressor. In the differential pressure section $B_1$, a path is formed between a compressor's $P_c$ pressure introducing port 15c and a suction side. In this path a $P_c$ valve disc 17 is installed which engages with or disengages from a valve seat $15e_2$ formed in the path on the suction side of a valve opening $15e_1$. The $P_c$ valve disc 17 is urged by an adjust spring 20 to close the valve opening. In the solenoid proportional control section $B_2$, a plunger chamber $R_3$ is formed which has a $P_d$ pressure introducing port 15g. A plunger 24 is movably installed in the plunger chamber $R_3$ and is fitted with a connecting rod 25, which passes through a through-hole $15d_1$ in the solenoid proportional control section $B_2$, the $P_c$ pressure introducing port 15c and the valve opening $15e_1$ to contact the $P_c$ valve disc 17. A plunger spring 26, which has greater spring force than the adjust spring 20, is installed in opposition to the adjust spring 20. In the plunger chamber $R_3$ is installed a $P_d$ valve disc 27 which opens and closes the through-hole $15d_1$ as the plunger 24 moves in the plunger chamber $R_3$.

1 Claim, 6 Drawing Sheets

SOLENOID TYPE CONTROL VALVE

BACKGROUND OF THE INVENTION

1. Field of the Invention

The present invention relates to a solenoid type control valve used mainly on variable-capacity compressors of air conditioners for vehicles.

2. Description of the Prior Art

In FIG. 6 (Japanese Patent Preliminary Publication No. Showa 62-247186), a plurality of cylinders b and crank chambers c are formed in a compressor a. In the compressor, the cylinders are communicated through a valve plate e, which has a suction valve mechanism and a delivery valve mechanism, to a delivery chamber d and an annular suction chamber s.

In each cylinder b is installed a piston f, which is slidable therein and is connected through a piston rod i to a wobble plate h that is mounted on a drive shaft g driven by the engine. The delivery chamber d and the suction chamber s are connected to an external cooling circuit via a delivery port and a suction port.

As a pressure difference $\Delta p$ (i.e. $P_c-P_s$) between the pressure $P_c$ in the crank chamber c and the pressure Ps in the suction chamber s increases, the stroke of the piston f becomes smaller, reducing the inclination angle of the wobble plate h and therefore the compressing capacity. Conversely, when the pressure difference $\Delta p$ decreases, the stroke of the piston f increases, increasing the inclination angle of the wobble plate h and therefore the compressing capacity.

An air supply path $p_1$ is formed to supply a high-pressure gas in the delivery chamber d to the crank chamber c. In the air supply path $p_1$ is installed an external capacity control valve $v_1$, which consists of a solenoid valve. To feed back, from the crank chamber c to the suction chamber s, gases bleeding from the compressing chamber in the cylinder b to the crank chamber c or gases supplied from the delivery chamber d to the crank chamber c through the air supply path $p_1$, an air bleeder path $p_2$ is formed between the crank chamber c and the suction chamber s. The air bleeder path $p_2$ is adjusted in its opening degree by a self-capacity control valve $v_2$.

When, during the startup of the compressor, the temperature in the vehicle to be cooled is high or the cooling load is high, the suction pressure $P_s$ is higher than a setting value $P_{s0}$, causing the external capacity control valve $v_1$ to be closed shutting off the air supply path $p_1$. Since the crank chamber pressure $P_c$ is higher than the setting value $P_{c0}$, the self-capacity control valve $v_2$ is opened to open the air bleeder path $p_2$. The pressure difference $\Delta p$ between the crank chamber pressure $P_c$ and the suction pressure $P_s$ is kept smaller than the setting value $\Delta p_0$. As a result, the piston f is reciprocated in the maximum stroke with the wobble plate h at a large inclination angle, performing the full-compressing capacity operation.

After this, as the compression operation proceeds, the suction pressure $P_s$ and the crank chamber pressure $P_c$ gradually decreases. When the crank chamber pressure $P_c$ reaches the setting value $P_{c0}$, the self-capacity control valve $v_2$ is closed to stop the gas flow from the crank chamber c to the suction chamber s.

As the temperature in the car lowers reducing the cooling load and the suction pressure $P_s$ becomes lower than the setting value $P_{s0}$, the external capacity control valve $v_1$ is opened, supplying the high-pressure gas from the delivery chamber d to the crank chamber c through the air supply path $p_1$. This results in an increase in the crank chamber pressure $P_c$, increasing the pressure difference $\Delta p$. This in turn reduces the stroke of the piston f, inclining the wobble plate h in a direction that reduces the compressing capacity.

SUMMARY OF THE INVENTION

In the prior art solenoid type control valve, two control valves are used—an external capacity control valve $v_1$ as a solenoid valve for increasing the pressure in the crank chamber c and a self-capacity control valve $v_2$ as a pressure differential valve for reducing the pressure in the crank chamber c—to control the pressure difference $(P_c-P_s)$ between the crank chamber c and the suction chamber s, the control is complex and costly.

With a view to solving the above-mentioned problem, the present invention has two valves with different purposes formed into a single simplified valve mechanism.

To achieve the above objective, a solenoid type control valve according to the present invention comprises: a differential pressure valve section; a solenoid proportional control section; a path formed in the differential pressure valve section between a compressor's $P_c$ pressure introducing port and a suction side; a valve seat formed on the suction side of a valve opening in the path; a $P_c$ valve disc installed in the path and adapted to engage with and disengage from the valve seat; an adjust spring to urge the $P_c$ valve disc in a valve closing direction; a plunger chamber formed in the solenoid proportional control section and having a $P_d$ pressure introducing port; a plunger movably installed in the plunger chamber; a through-hole formed in the solenoid proportional control section; a connecting rod passing through the through-hole, the $P_c$ pressure introducing port and the valve opening to engage with the $P_c$ valve disc; a plunger spring installed in opposition to the adjust spring, the plunger spring having an elastic force greater than that of the adjust spring; and a $P_d$ valve disc installed in the plunger chamber in such a way that the movement of the plunger causes the $P_d$ valve disc to close or open the through-hole; whereby when the maximum current is applied, the connecting rod parts from the $P_c$ valve disc that has closed the valve opening and the $P_d$ valve disc opens the through-hole.

When the solenoid proportional control section is not energized, a plunger spring overcomes the force of an adjust spring, opening a $P_c$ valve body through a connecting rod to let the $P_c$ pressure of the compressor flow into the lower pressure side, performing the full-load operation. When the solenoid proportional control section is energized, the $P_c$ valve body is opened or closed in proportion to the amount of current applied. When the maximum current is applied, the $P_c$ valve body is closed and at the same time the $P_d$ valve body is opened to rapidly admit the $P_d$ pressure into the pressure control chamber, entering a rapid unload operation.

DETAILED DESCRIPTION OF PREFERRED EMBODIMENT

Figure 1:
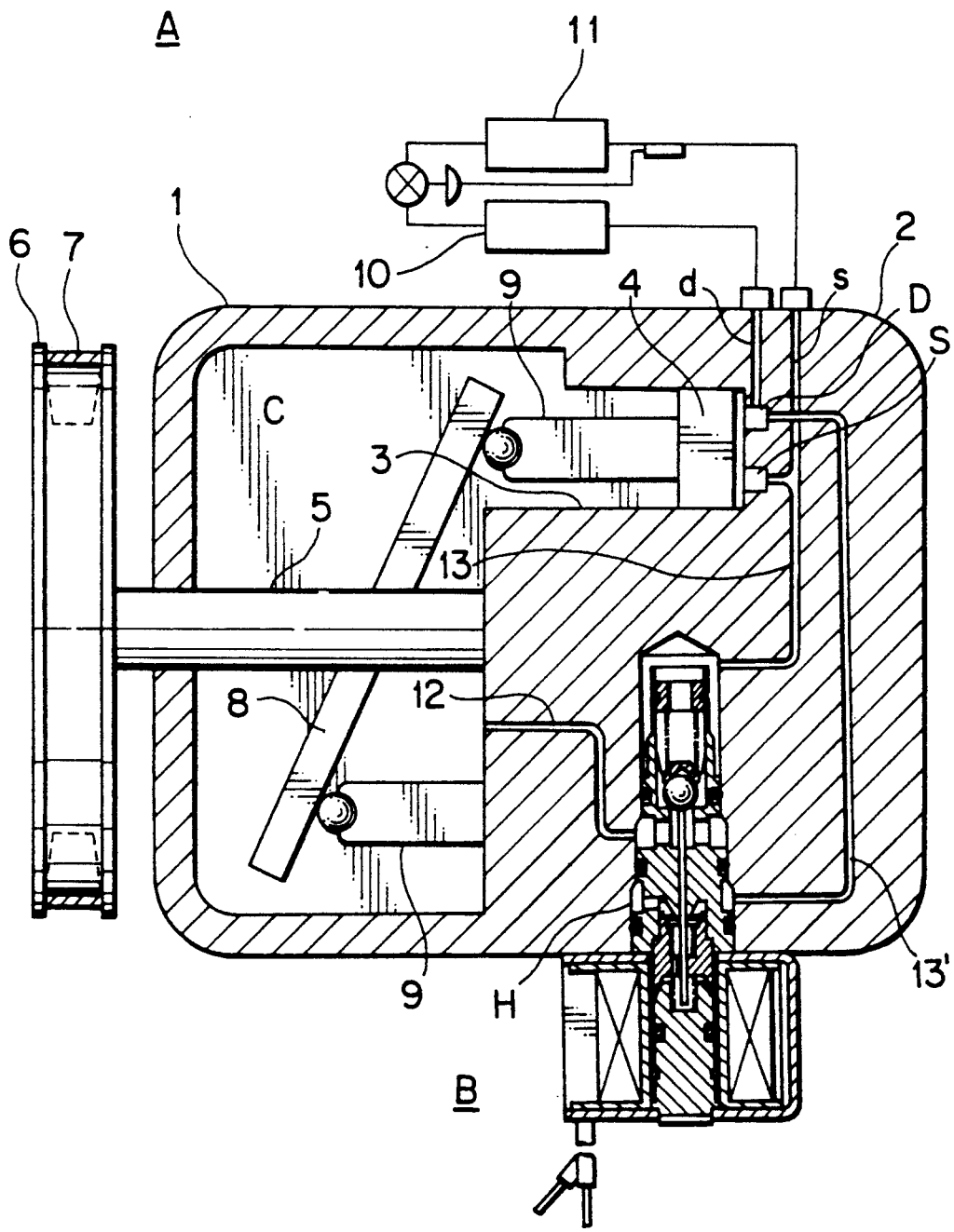
FIG. 1 is a schematic view showing the solenoid type control valve of the present invention in operation.

FIG. 1 shows a capacity control mechanism in a variable capacity compressor used in automobiles. In the figure, designated A is a compressor, and B a solenoid type control valve for capacity control secured to a mounting recess formed in one side of the compressor A.

In the compressor A, a plurality of cylinders are provided in a head section 2 integrally formed with a crank case 1. A piston 4 is slidably installed in each of the cylinders 3. A drive shaft 5 is rotatably supported extending from the crank case 1 to the head section 2 and is driven by an engine (not shown) through a pulley 6 and a belt 7.

The drive shaft 5 is fitted, as is known, with a variable angle wobble plate 8, which is connected with pistons 4 through piston rods 9. As the wobble plate 8, which is inclined, is driven by the drive shaft 5, the piston rods 9 and the pistons 4 are reciprocated. According to the pressure difference between a control chamber pressure $P_c$ in the crank case 1 and a suction pressure $P_s$ in the cylinder 3, the mounting angle of the wobble plate 8 is automatically adjusted. The variation in the angle of the wobble plate 8 is translated into a change in the stroke of the piston 4.

Each cylinder 3 is provided with a suction port S and a delivery port D. One of the cylinders 3 is connected through passages d, s with a condenser 10 and an evaporator 11 that form a refrigeration cycle. The capacity control valve B is connected to a control chamber C in the crank case 1 through a coolant path 12, to the suction port S through a coolant path 13, and to a delivery port D through a coolant path 13'.

Figure 2:
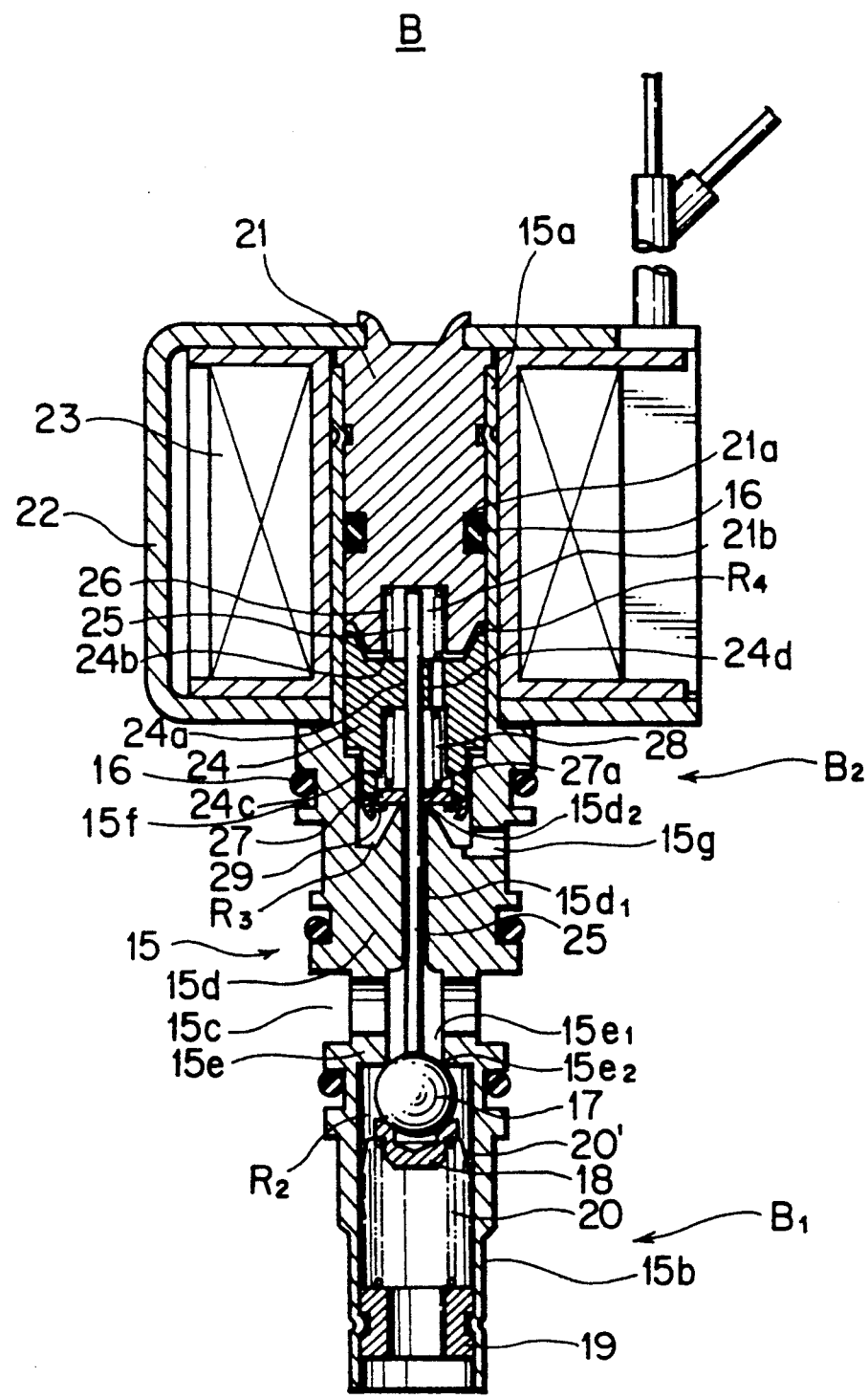
FIG. 2 is a cross section of the solenoid type control valve according to this invention.

FIG. 2 shows the capacity control valve B, which consists of a differential pressure valve section $B_1$ and solenoid proportional control section $B_2$. A valve body 15 has a plunger tube portion 15a at one end and a support tube portion 15b at the other end, both formed integral with each other. At the intermediate portion of the valve body 15, a partition wall 15d of the solenoid proportional control section $B_2$ and a partition wall 15e of the differential pressure valve section $B_1$ axially face each other with a $P_c$ pressure introducing port 15c therebetween. The partition wall 15d is formed with a through-hole $15d_1$ and the partition wall 15e with a valve opening $15e_1$ and a valve seat $15e_2$. The valve body 15 is formed, on its outer circumference, with an annular groove 15f to accommodate a sealing O-ring 16.

In a valve chamber $R_2$ defined by the partition wall 15e, a ball-like $P_c$ valve disc 17 is supported by a valve retainer 18 to face the valve seat $15e_2$. The valve disc 17 is urged toward the valve seat $15e_2$ to engage it by an adjust spring 20, which is installed between the valve retainer 18 and a spring retainer 19 caulked and secured by the support tube 15b. The valve retainer 18, which is kept in suspension, is provided with a vibration prevention blade 20', that is in sliding contact with the inner surface of the valve chamber $R_2$.

In the plunger tube portion 15a a stationary attraction piece 21 is caulked and fixed. A solenoid coil 23 is installed in an outer case 22 surrounding the plunger tube portion 15a. In a plunger chamber $R_3$ between the stationary attraction piece 21 and the partition wall 15d, a plunger 24 is installed axially movable. The plunger 24 has a connecting rod 25 fitted under pressure into a connecting hole 24a thereof, the connecting rod 25 extending through the through-hole $15d_1$ and the valve opening $15e_1$ to reach the $P_c$ valve disc 17.

In a central recessed portion 21b of the stationary attraction piece 21 a plunger spring 26 is installed between it and the plunger 24 to urge the plunger 24 toward the partition wall 15d. Between the plunger 24 and the stationary attraction piece 21 is formed a gap $R_4$ by the connecting rod 25 that contacts the stationary attraction piece 21, in order to prevent the plunger 24 from getting stuck to the stationary attraction piece 21, in which case the plunger 24 would not part from the stationary attraction piece 21 unless the current is reduced to almost zero lowering the controllability. The plunger 24 is formed with a central recessed portion 24c on the partition wall 15d side and also with a communication hole 24d that communicates the central recessed portion 24c with the recessed portion 24b. Hence, the coolant passes through the $P_d$ pressure introducing hole 15g, the plunger chamber $R_3$, the central recessed portion 24c, the communication hole 24d and the recessed portion 24b and into the gap $R_4$ filling it. This prevents the coolant and oil remaining between the stationary attraction piece 21 and the plunger 24 from being compressed into liquid and retarding the motion of the plunger 24. A sealing O-ring 16 is installed in an annular groove 21a formed in the outer circumference of the stationary attraction piece 21.

In the solenoid proportional control section $B_2$, the valve body 15 is formed with a $P_d$ pressure introducing hole 15g. In the plunger chamber $R_3$ a valve seat $15d_2$ is formed at the end of the through-hole $15d_1$. In the central recessed portion 24c of the plunger 24, a valve disc 27 is slidably mounted on the connecting rod 25, which is inserted through a center hole 27a of the disc 27. The valve disc 27 is urged toward the valve seat $15d_2$ by a spring 28 installed between the plunger 24 and the valve disc 27. The plunger 24 is provided with a valve opening drive piece 29 that engages with the valve disc 27.

Figure 4:
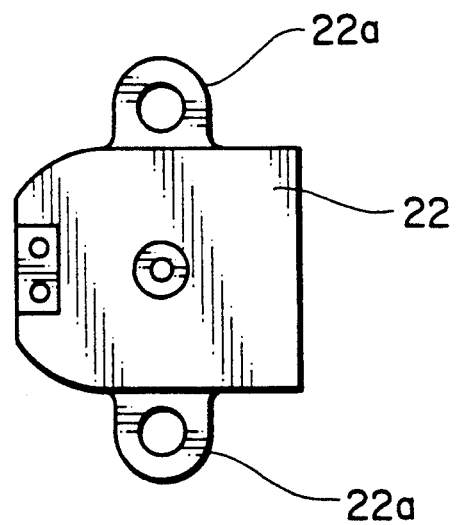
FIG. 4 is a plan view of an outer case of the solenoid type control valve of this invention.

The solenoid type control valve B is inserted into the mounting recess H in the compressor A until the outer case 22 engages with the outer surface of the head section 2 of the compressor A. The solenoid type control valve B is secured to the head section 2 by screws through mounting tabs 22a (FIG. 4). In this condition, the $P_c$ pressure introducing hole 15c communicates with the $P_c$ coolant path 12, the valve chamber $R_2$ with the $P_s$ coolant path 13, and the $P_d$ pressure introducing hole 15g with the $P_d$ coolant path 13' (FIG. 1).

When the control chamber pressure $P_c$ becomes higher than the low pressure $P_s$, the wobble plate 8 changes to a vertical attitude causing the variable capacity compressor A to enter into the unload operation in which the compression stroke is short. When the control chamber pressure $P_c$ becomes equal to $P_s$, the compressor a enters into the full load operation.

Because there is a gap between the cylinder and the piston 4 in the compressor A, the blow-by gas flows into the pressure control chamber C. In order to change the capacity of the compressor by utilizing this gas, a control valve is arranged between the pressure control chamber C and the low-pressure side S. That is, when the pressure control chamber C and the low-pressure side S are cut off from each other, the pressure relationship will be $P_c > P_s$; and when they are communicated with each other, the pressure relationship will be $P_c = P_s$. By providing the control valve between the pressure control chamber C and the low-pressure side S to regulate the coolant flow, it is possible to change the capacity of the compressor A in a range from the full load operating condition to the unload operating operation.

If the amount of bleeding blow-by gas is set small, when the current for the solenoid proportional control section $B_2$ is rapidly increased from zero to the maximum value to operate the $P_c$ valve disc 17, the control chamber pressure $P_c$ increases only gradually making the rapid unload operation impossible. On the other hand, if the amount of blow-by gas is set large, the cooling capacity (during full load operation) deteriorates. In the above construction, during the full load operation with the solenoid coil 23 not energized (FIG. 3a), the force of the plunger spring 26 is stronger than that of the adjust spring 20, so that the connecting rod 25 that moves together with the plunger 24 drives the $P_c$ valve disc 17 to open the valve opening $15e_1$ to the maximum degree. In this condition, the $P_d$ valve disc 27 is engaged with the valve seat $15d_2$, i.e the valve is closed.

Figure 3:
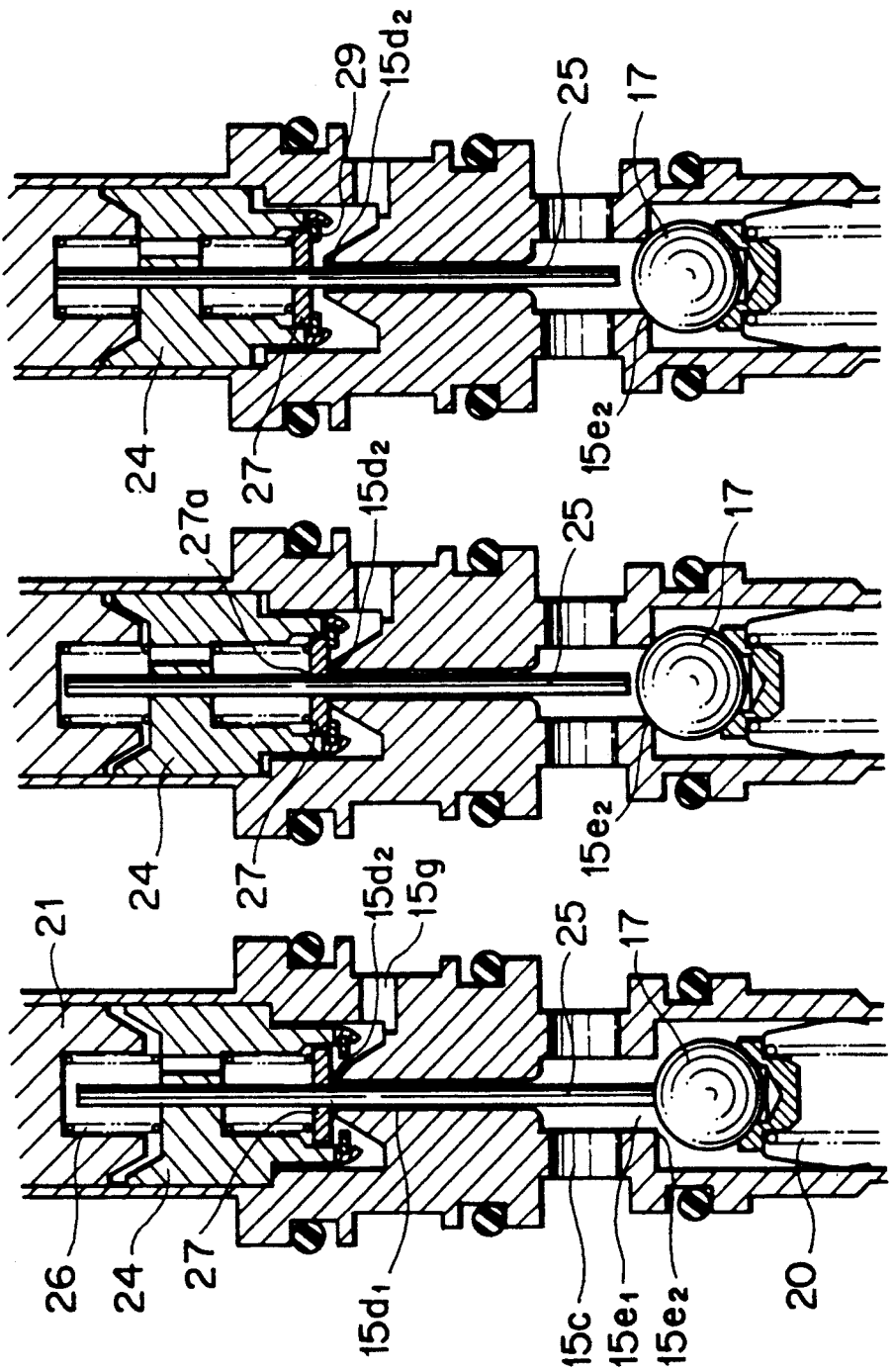
FIG. 3a, 3b, 3c are cross sections showing the operating conditions of the solenoid type control valve of this invention, with FIG. 3a representing a full-load operation, FIG. 3b a gradual unload operation and FIG. 3c a rapid unload operation.

When the solenoid coil 23 is energized, the plunger 24 is attracted to the stationary attraction piece 21 according to the coil current. As the connecting rod 25 moves together with the plunger 24, the adjust spring 20 causes the $P_c$ valve disc 17 to move linearly in the valve closing direction. At the intermediate current level, the $P_c$ valve disc 17 engages with the valve seat $15e_2$ closing the valve. As the plunger 24 further moves, the connecting rod 25 parts from the $P_c$ valve disc 17 to reduce hysteresis. However, the $P_d$ valve disc 27 is kept engaged with the valve seat $15d_2$ by the spring 28. In this case, the leaking $P_d$ pressure bleeding through a gap between the connecting rod 25 and the center hole 27a of the valve disc 27 flows into the pressure control chamber C gradually increasing the $P_c$ pressure, thereby performing the gradual unload operation (FIG. 3b).

At the maximum current, with the $P_c$ valve disc 17 still closed, the $P_d$ valve disc 27 is separated from the valve seat $15d_2$ by the valve opening drive piece 29, abruptly admitting the $P_d$ pressure into the pressure control chamber C, resulting in a sharp increase in the $P_c$ pressure. As a result, the rapid unload operation is performed (FIG. 3c).

At the maximum current, the connecting rod 25 works to secure the gap $R_4$ to prevent the plunger 24 from getting stuck to the attraction piece 21 and thereby ensure a precise proportional operation. Since the plunger 24 is formed with the communication hole 24d, through which the high pressure $P_d$ from the compressor fills the gap $R_4$, erroneous operation due to coolant pressure variation can be prevented.

Figure 5:
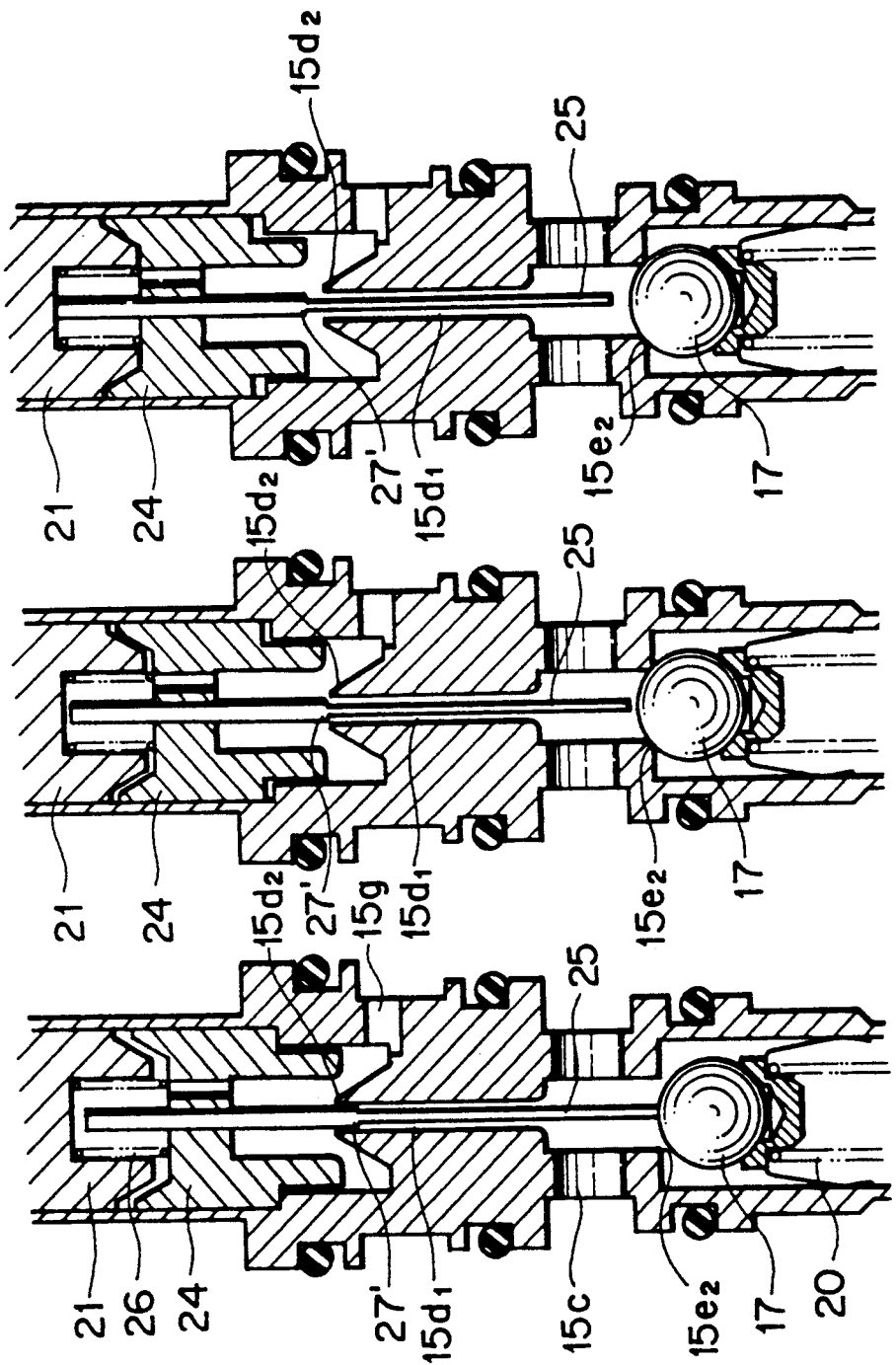
FIG. 5a, 5b, 5c are cross sections showing the operating conditions of another embodiment of the solenoid type control valve of this invention, with FIG. 5a representing a full-load operation, FIG. 5b a gradual unload operation and FIG. 5c a rapid unload operation.
Figure 6:
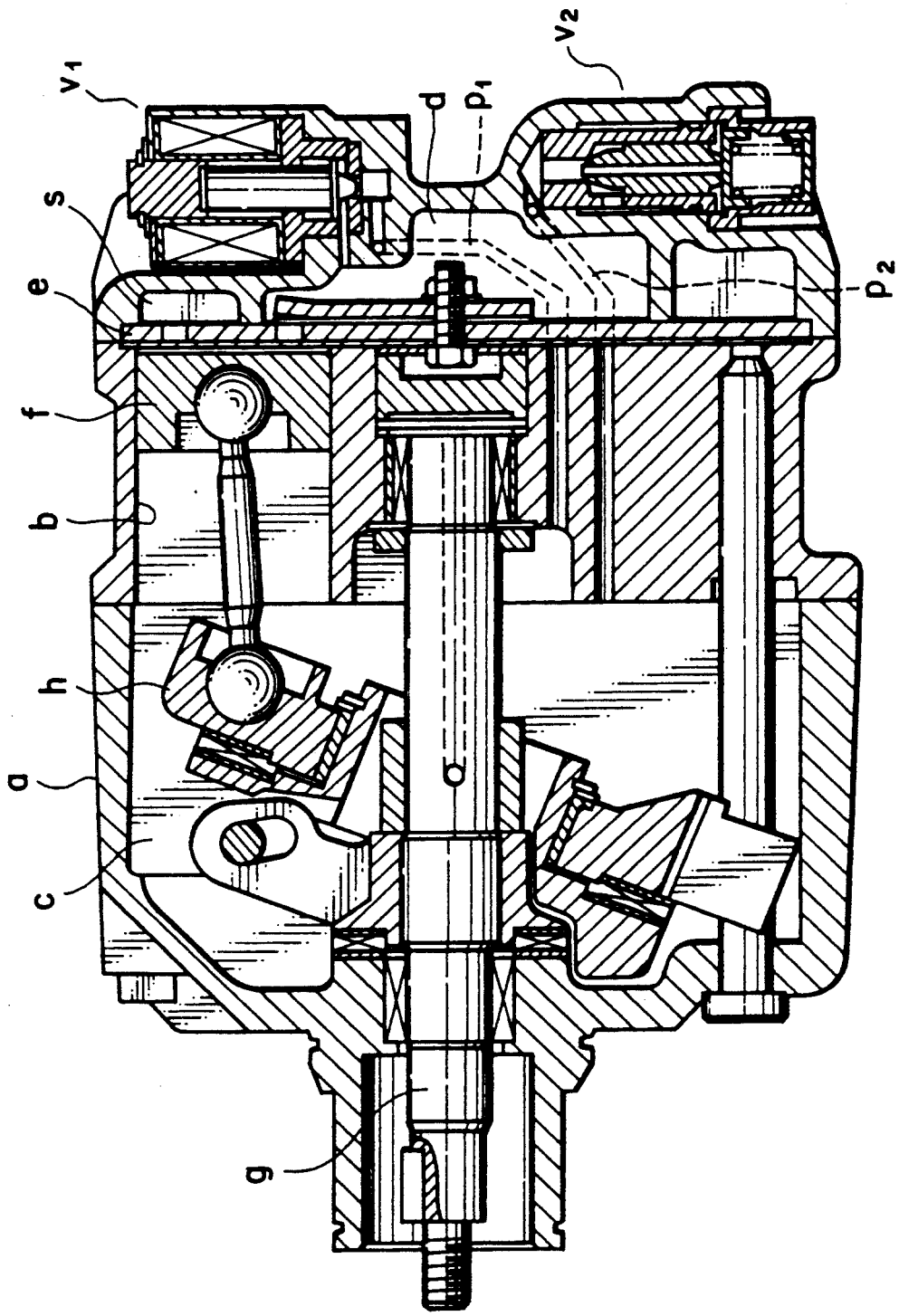
FIG. 6 is a cross section of a conventional solenoid type control valve.

In another embodiment shown in FIG. 5, a bulged $P_d$ valve disc 27' is formed on the connecting rod 25 in the solenoid proportional control section $B_2$ so that the $P_d$ valve disc 27' closes and opens the valve seat $15d_2$ as it advances to and retracts from the through-hole $15d_1$.

FIG. 5a shows the full load operation when the solenoid coil 23 is not energized, with the $P_d$ valve disc 27' advanced into the valve seat $15d_2$.

FIG. 5b shows the $P_d$ valve disc 27' close to the valve seat $15d_2$ when the current applied to the solenoid coil 23 is an intermediate value. The leaking $P_d$ pressure flows through the gap between the $P_d$ valve disc 27' and the valve seat $15d_2$ into the pressure control chamber C, resulting in a gradual unload operation.

FIG. 5c shows the $P_d$ valve disc 27' completely parted from the valve seat $15d_2$ when the current applied to the solenoid coil 23 is the maximum value. The $P_d$ pressure is rapidly admitted into the pressure control chamber C, resulting in a rapid unload operation.

As described above, the solenoid type control valve of this invention comprises: a differential pressure valve section; a solenoid proportional control section; a path formed in the differential pressure valve section between a compressor's $P_c$ pressure introducing port and a suction side; a valve seat formed on the suction side of a valve opening in the path; a $P_c$ valve disc installed in the path and adapted to engage with and disengage from the valve seat; an adjust spring to urge the $P_c$ valve disc in a valve closing direction; a plunger chamber formed in the solenoid proportional control section and having a $P_d$ pressure introducing port; a plunger movably installed in the plunger chamber; a through-hole formed in the solenoid proportional control section; a connecting rod passing through the through-hole, the $P_c$ pressure introducing port and the valve opening to engage with the $P_c$ valve disc; a plunger spring installed in opposition to the adjust spring, the plunger spring having an elastic force greater than that of the adjust spring; and a $P_d$ valve disc installed in the plunger chamber in such a way that the movement of the plunger causes the $P_d$ valve disc to close or open the through-hole; whereby when the maximum current is applied, the connecting rod parts from the $P_c$ valve disc that has closed the valve opening and the $P_d$ valve disc opens the through-hole. Since the $P_c$ valve and the $P_d$ valve are incorporated into a single valve mechanism, the construction is made substantially simpler than that of the conventional control valve. Furthermore, the valve disc can quickly and precisely be operated proportionally with a relatively small electromagnetic force.

What is claimed is:

1. A solenoid type control valve comprising:
   a differential pressure valve section;
   a solenoid proportional control section;
   a path formed in the differential pressure valve section between a compressor's $P_c$ pressure introducing port and a suction side;
   a valve seat formed on the suction side of a valve opening in the path;
   a $P_c$ valve disc installed in the path and adapted to engage with and disengage from the valve seat;
   an adjust spring to urge the $P_c$ valve disc in a valve closing direction;
   a plunger chamber formed in the solenoid proportional control section and having a $P_d$ pressure introducing port;
   a plunger movably installed in the plunger chamber;
   a through-hole formed in the solenoid proportional control section;
   a connecting rod passing through the through-hole, the $P_c$ pressure introducing port and the valve opening to engage with the $P_c$ valve disc;

a plunger spring installed in opposition to the adjust spring, the plunger spring having an elastic force greater than that of the adjust spring; and a $P_d$ valve disc installed in the plunger chamber in such a way that the movement of the plunger causes the $P_d$ valve disc to close or open the through-hole;

whereby when the maximum current is applied, the connecting rod parts form the $P_c$ valve disc that has closed the valve opening and the $P_d$ valve disc opens the through-hole.

* * * * *